(12) United States Patent
Subat et al.

(10) Patent No.: US 10,029,590 B2
(45) Date of Patent: *Jul. 24, 2018

(54) SPEAKER GRILL ASSEMBLY FOR VEHICLE SEATS

(71) Applicant: Bose Corporation, Framingham, MA (US)

(72) Inventors: Bradford Kyle Subat, Worcester, MA (US); Charles Oswald, Arlington, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,414

(22) Filed: Jun. 7, 2017

(65) Prior Publication Data

US 2017/0267139 A1    Sep. 21, 2017

Related U.S. Application Data

(63) Continuation of application No. 15/071,631, filed on Mar. 16, 2016, now Pat. No. 9,682,641.

(51) Int. Cl.
| | | |
|---|---|---|
| *H04R 1/00* | (2006.01) |
| *H04R 1/02* | (2006.01) |
| *H04R 5/02* | (2006.01) |
| *B60N 2/48* | (2006.01) |
| *B60R 11/02* | (2006.01) |
| *B60N 2/879* | (2018.01) |
| *B60N 2/885* | (2018.01) |

(Continued)

(52) U.S. Cl.
CPC ........... *B60N 2/4876* (2013.01); *B60N 2/879* (2018.02); *B60N 2/885* (2018.02); *B60R 11/0217* (2013.01); *H04R 1/023* (2013.01); *H04R 1/025* (2013.01); *H04R 5/023* (2013.01); *B60N 2002/899* (2018.02); *B60R 2011/0017* (2013.01); *H04R 2499/13* (2013.01)

(58) Field of Classification Search
CPC .......... B60N 2002/4888; B60N 2/4876; B60N 2/4882; B60R 11/0217; B60R 2011/0017; H04R 1/023; H04R 1/025; H04R 2499/13; H04R 5/023
USPC ......... 381/86, 189, 300, 302, 386, 389, 390, 381/391, 392, 393
See application file for complete search history.

(56) References Cited

U.S. PATENT DOCUMENTS 3,944,020 A * 3/1976 Brown ................. B60N 2/4876
181/141
4,075,438 A * 2/1978 Kappel ................. H04R 5/023
381/301

(Continued)

*Primary Examiner* — Khai N Nguyen
(74) *Attorney, Agent, or Firm* — Fish & Richardson P.C.

(57) ABSTRACT

The technology described in this document can be embodied in a seat headrest that includes an interior chamber that accommodates an acoustic transducer, and an acoustic channel disposed between the interior chamber and an external opening in the seat headrest. The headrest also includes a soft outer layer disposed around at least a portion of a periphery of the external opening, and a grill mount. The grill mount is disposed in or attached to the outer layer, the grill mount extending, at least in part, around the periphery of the acoustic channel, and configured to engage with a portion of a speaker grill-assembly in a mating configuration.

20 Claims, 10 Drawing Sheets

(51) Int. Cl.
*B60R 11/00* (2006.01)
*B60N 2/80* (2018.01)

(56) References Cited

U.S. PATENT DOCUMENTS

| | | | | |
|---|---|---|---|---|
| 4,848,836 | A * | 7/1989 | Masui | B60N 2/48 |
| | | | | 297/220 |
| 5,750,942 | A * | 5/1998 | Flick | H04R 5/02 |
| | | | | 181/141 |
| 6,324,294 | B1 * | 11/2001 | Azima | B60R 11/0217 |
| | | | | 181/287 |
| 6,991,289 | B2 * | 1/2006 | House | A47C 7/72 |
| | | | | 181/141 |
| 8,542,846 | B2 * | 9/2013 | Matejczyk | H04R 5/02 |
| | | | | 381/302 |
| 8,913,777 | B2 * | 12/2014 | Pelliccio | B60N 2/0232 |
| | | | | 297/217.4 |
| 9,088,842 | B2 * | 7/2015 | Silverstein | H04R 1/023 |
| 9,327,628 | B2 * | 5/2016 | Subat | B60N 2/4876 |
| 9,403,454 | B2 * | 8/2016 | Subat | B60N 2/44 |
| 9,440,566 | B2 * | 9/2016 | Subat | H04R 5/023 |
| 9,682,641 | B1 * | 6/2017 | Subat | B60N 2/4876 |
| 2004/0021350 | A1 * | 2/2004 | House | A47C 7/72 |
| | | | | 297/217.4 |
| 2004/0237111 | A1 * | 11/2004 | Iraclianos | B60K 35/00 |
| | | | | 725/75 |
| 2005/0025609 | A1 * | 2/2005 | Oxford | B60R 11/0217 |
| | | | | 411/339 |
| 2006/0057349 | A1 * | 3/2006 | Neitzke | B60R 13/02 |
| | | | | 428/221 |
| 2008/0205232 | A1 * | 8/2008 | Matejczyk | H04R 5/02 |
| | | | | 369/64 |
| 2014/0219492 | A1 * | 8/2014 | Pelliccio | B60N 2/0232 |
| | | | | 381/389 |
| 2014/0270322 | A1 * | 9/2014 | Silverstein | H04R 1/023 |
| | | | | 381/391 |
| 2014/0355783 | A1 * | 12/2014 | Subat | B60N 2/4876 |
| | | | | 381/86 |
| 2015/0201260 | A1 * | 7/2015 | Oswald | H04R 1/025 |
| | | | | 381/86 |
| 2016/0137106 | A1 * | 5/2016 | Subat | B60N 2/44 |
| | | | | 381/389 |
| 2016/0159260 | A1 * | 6/2016 | Subat | H04R 5/023 |
| | | | | 297/217.5 |
| 2017/0267139 | A1 * | 9/2017 | Subat | B60N 2/4876 |

* cited by examiner

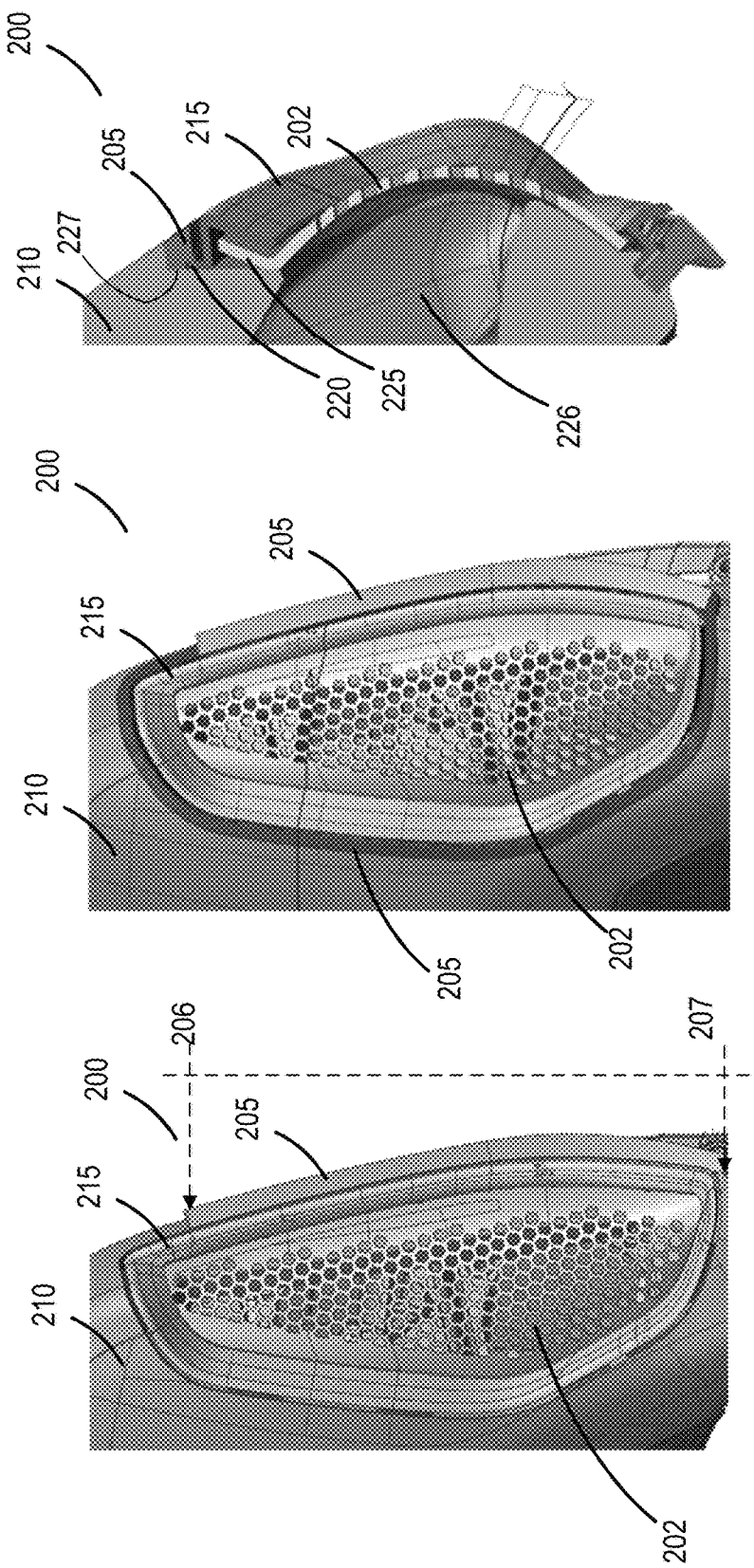

SHORE HARDNESS SCALES

| EXTRA SOFT | SOFT | MEDIUM SOFT | MEDIUM HARD | HARD | EXTRA HARD |

SHORE 00: 0 10 20 30 40 50 60 70 80 90 100

SHORE A: 0 10 20 30 40 50 60 70 80 90 100

SHORE D: 0 10 20 30 40 50 60 70 80 90 100

*FIG. 3*

SPEAKER GRILL ASSEMBLY FOR VEHICLE SEATS

PRIORITY CLAIM

This application is a Continuation of U.S. patent application Ser. No. 15/071,631, filed on Mar. 16, 2016, now U.S. Pat. No. 9,682,641, the entire content of which is incorporated herein by reference.

TECHNICAL FIELD

This disclosure generally relates to seats that include acoustic output devices such as speakers.

BACKGROUND

Headrests used in vehicle seats can include speakers to deliver a near-field acoustic experience.

SUMMARY

In one aspect, this document features a seat headrest that includes an interior chamber that accommodates an acoustic transducer, and an acoustic channel disposed between the interior chamber and an external opening in the seat headrest. The headrest also includes a soft outer layer disposed around at least a portion of a periphery of the external opening, and a grill mount. The grill mount is disposed in or attached to the outer layer, the grill mount extending, at least in part, around the periphery of the acoustic channel, and configured to engage with a portion of a speaker grill-assembly in a mating configuration.

In another aspect, this document features a grill mount for a speaker system disposed in a portion of a vehicle seat. The grill mount includes an attachment surface configured to allow the grill mount to be attached to an outer layer of the vehicle seat. The outer layer is disposed around at least a portion of a periphery of an external opening of an acoustic channel associated with the speaker system. The grill mount features an engagement structure that is configured to engage a portion of a speaker grill-assembly in a mating configuration such that the speaker grill-assembly is removable from the engagement structure following engagement. The grill mount extends, at least in part, around the periphery of the acoustic channel.

In another aspect, this document features a housing for an acoustic transducer. The housing includes an interior chamber, and an acoustic channel disposed between the interior chamber and an external opening of the housing, wherein at least a portion of a periphery of the external opening comprises a soft outer layer. The housing also includes a grill mount over-molded on the soft outer layer, the grill mount extending, at least in part, around the periphery of the acoustic channel, and configured to receive at least a portion of a speaker grill-assembly.

Implementations of the above aspects can include one or more of the following features.

The grill mount can be separated from a substantially rigid portion of the headrest, at least in part, by the soft outer layer. The soft outer layer can include a material having shore A hardness less than 50. The soft outer layer can include closed-cell foam. The grill mount can be over-molded on the soft outer layer. The grill mount can include a snap-fit mechanism configured to engage with the portion of the speaker grill-assembly. At least a portion of the grill-assembly can be constructed from a material having shore A hardness less than 90. The material can include a liquid silicone rubber or a rubber urethane. The grill mount can be visually occluded upon engaging with the speaker grill. The portion of a speaker grill-assembly can include at least a portion of a grill-ring.

The engagement structure can include a snap-fit mechanism configured to engage with the portion of the speaker grill. A portion of the grill-assembly can be constructed from a material having shore A hardness less than 90. The grill mount can be configured to fit a profile of at least a portion of the periphery of the acoustic channel around which the grill mount is disposed. The portion of the vehicle seat can include a headrest.

The soft outer layer can include closed-cell foam. At least the portion of the speaker grill-assembly can be over-molded on the soft outer layer. The portion of the speaker grill-assembly can include at least a portion of a grill-ring.

Various implementations described herein may provide one or more of the following advantages. Decoupling the grill mount from a rigid sub-structure allows for positioning the grill closer to an outside surface a vehicle seat or headrest. In some implementations, this may allow for making portions of the grill assembly deformable, and improve a user's comfort level. In some cases, the grill itself could be constructed from soft materials (e.g., materials with shore A hardness less than 90) to improve the comfort level.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DESCRIPTION OF THE DRAWINGS

FIGS. 2A-2G show examples of headrests in which the corresponding grill assemblies are decoupled from rigid structures of the headrests.

FIG. 3 shows a chart illustrating hardness of example materials.

DETAILED DESCRIPTION

Vehicle seats can be fitted with acoustic transducers or speakers for delivering a near-field acoustic experience. For example, speakers can be fitted into seats such that the speakers are proximate to the ears of an occupant of the seat, to provide an immersive, and potentially personalized acoustic experience. The speakers can be disposed, for example, in a headrest of the seat, or in a portion of the seat near the occupant's neck or shoulders. When multiple speakers are used, the speakers may also be distributed in various parts of the seat, for example, to provide an immersive acoustic effect. This document primarily uses examples of seat headrests to illustrate the technology. However, the technology is also applicable to speakers disposed in other portions of a seat. In addition, while the examples below refer to vehicle seats, other types of acoustically enabled seats or furniture that may have speakers installed in the manner described herein. For example, the technology can be used in massage chairs, sofas, recliners, tables, or beds fitted with speakers.

Figure 1A:
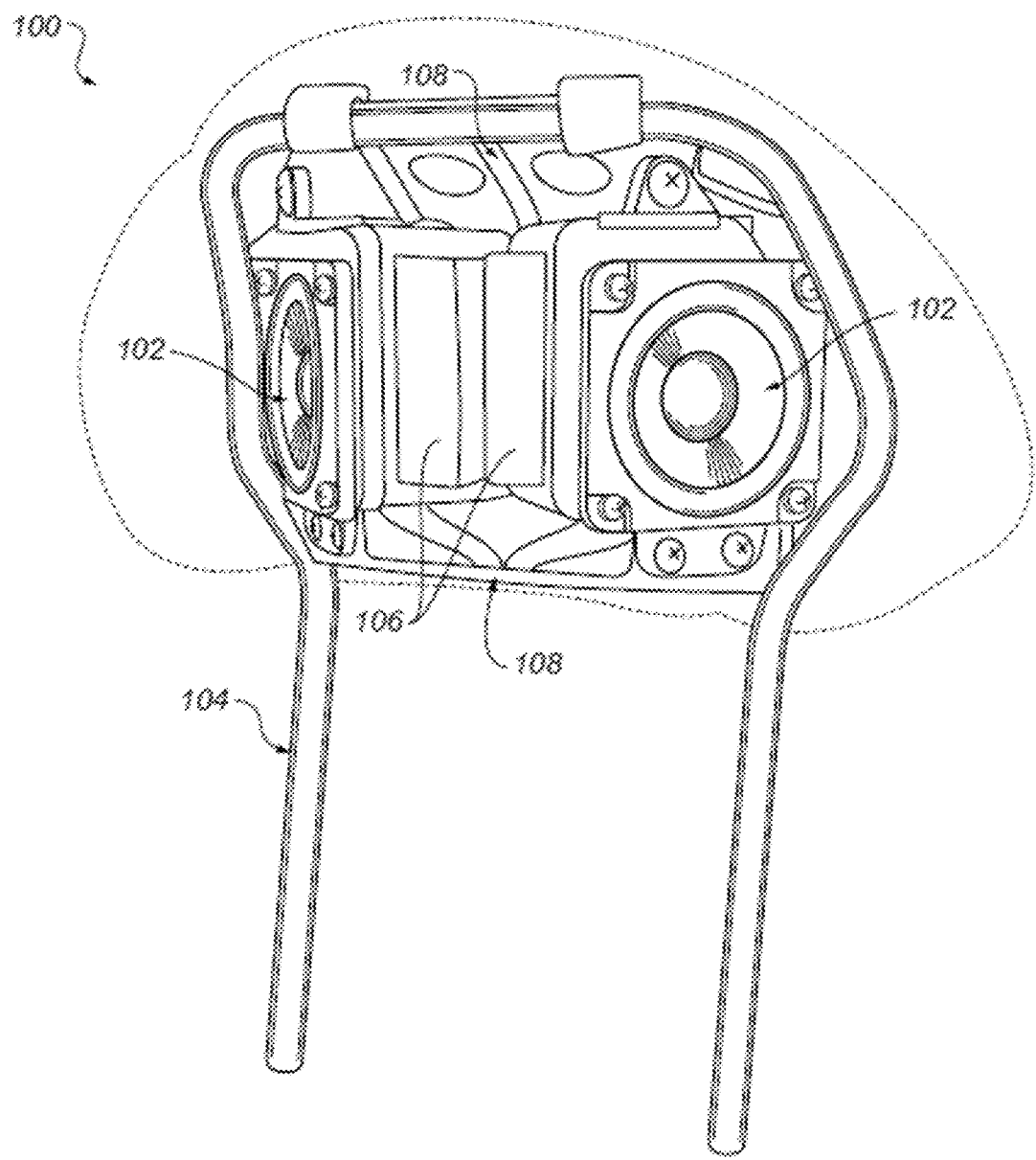
FIGS. 1A and 1B show perspective views of an inner portion of a headrest that includes speakers.
Figure 1B:
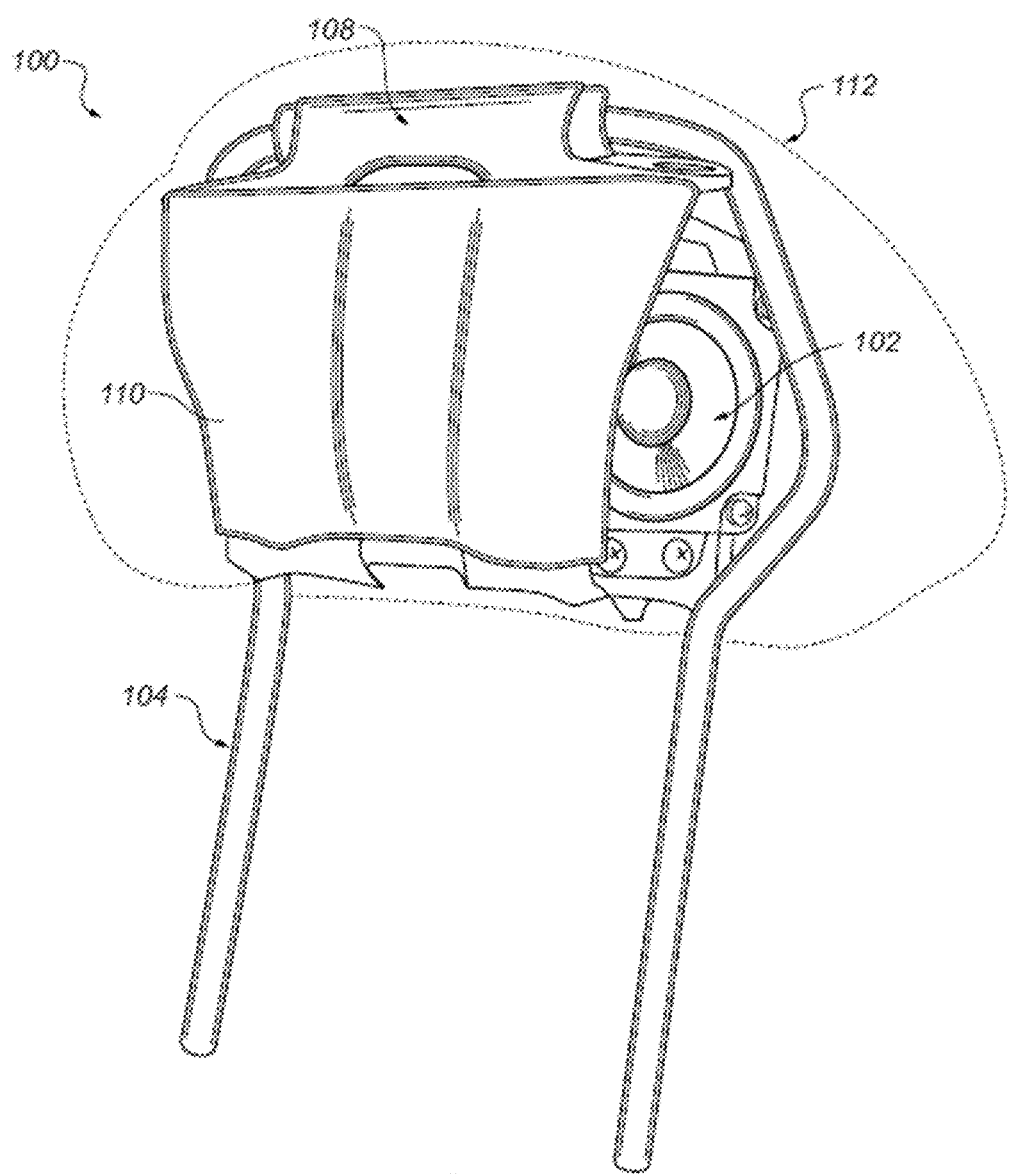

FIGS. 1A and 1B illustrate an example of a headrest 100 that incorporates speakers 102. Referring to FIG. 1A, the speakers 102 are attached to a U-shaped support rod 104 and are positioned such that the speakers 102 are directly behind the user's head (i.e., as opposed to the being located on the left and right sides of the U-shaped support rod 104, which in some cases, may be replaced by a combination of two separate bars) and to fire outwardly, in diverging directions on either side of the headrest 100.

Figure 1C:
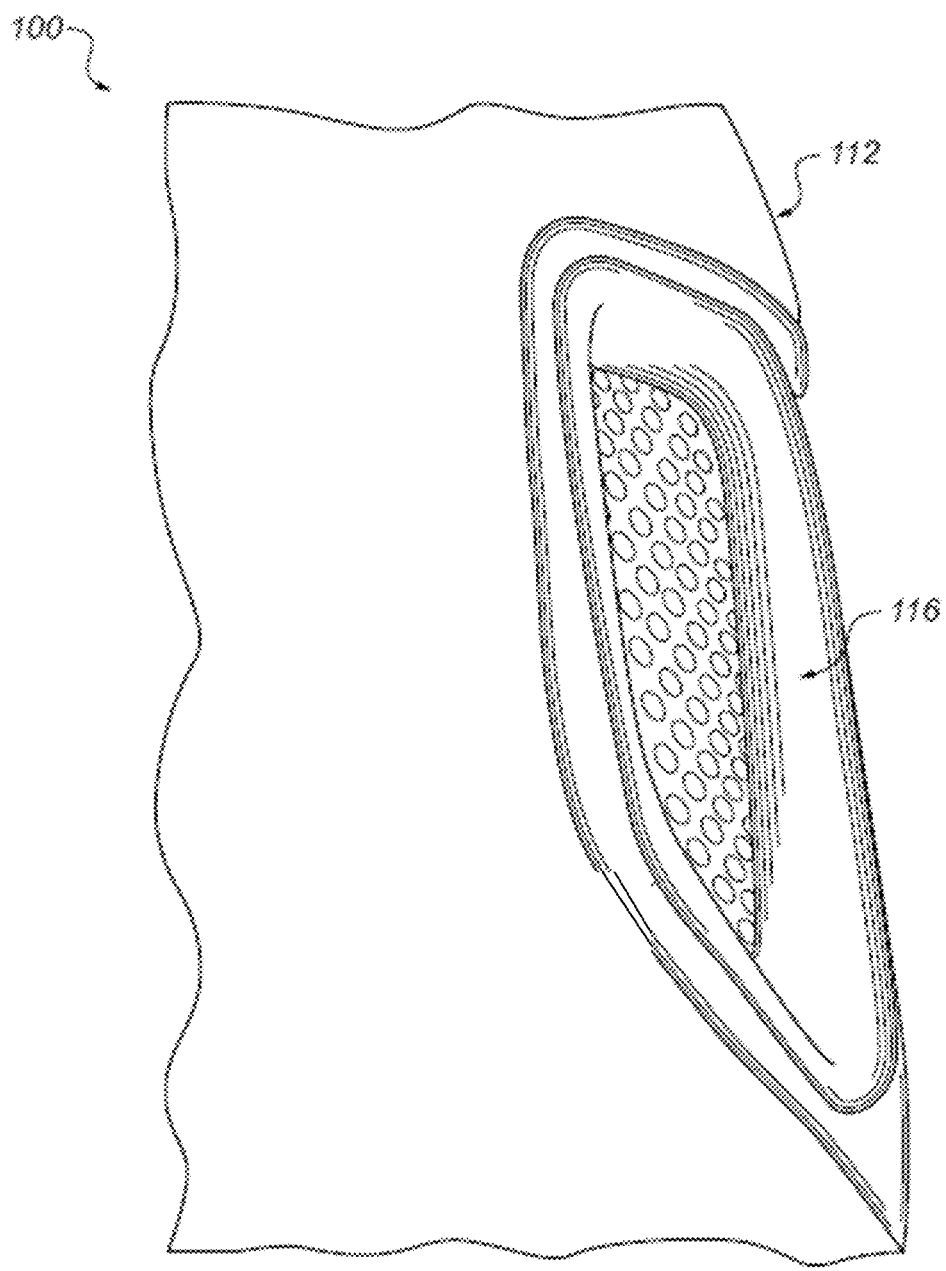
FIGS. 1C and 1D show examples of headrests in which a grill assembly is attached to an acoustic channel of a headrest.

In some cases, a small plastic enclosure 106 is attached to each speaker 102 for forming an acoustic enclosure. Each of those sub-assemblies then gets screwed into a two-piece sheet metal cage 108 which is secured to the U-shaped support rod 104. FIG. 1A shows a partial assembly with a front portion of the sheet metal cage 108 removed to view the speakers 102 and enclosures 106. FIG. 1B shows the sheet metal cage 108 fully assembled with the front portion 110 in place. A molded piece of foam cushioning is placed around that assembly, which is subsequently covered with a cover material 112 (e.g., fabric or leather). In some cases one or more openings may be provided in the foam cushions to allow acoustic energy to pass from the speakers to the environment surrounding the headrest. Each of the openings through which acoustic energy from a speaker 102 is radiated out can be covered using a grill assembly 116, as shown in FIG. 1C. The grill assembly 116 can protect the corresponding speaker 102, and assist in directing the radiation of acoustic energy toward the front of the headrest 100. The grill assembly 116 can be disposed on either side of the headrest 100, or elsewhere depending on the location of the acoustic channel opening.

Figure 1D:
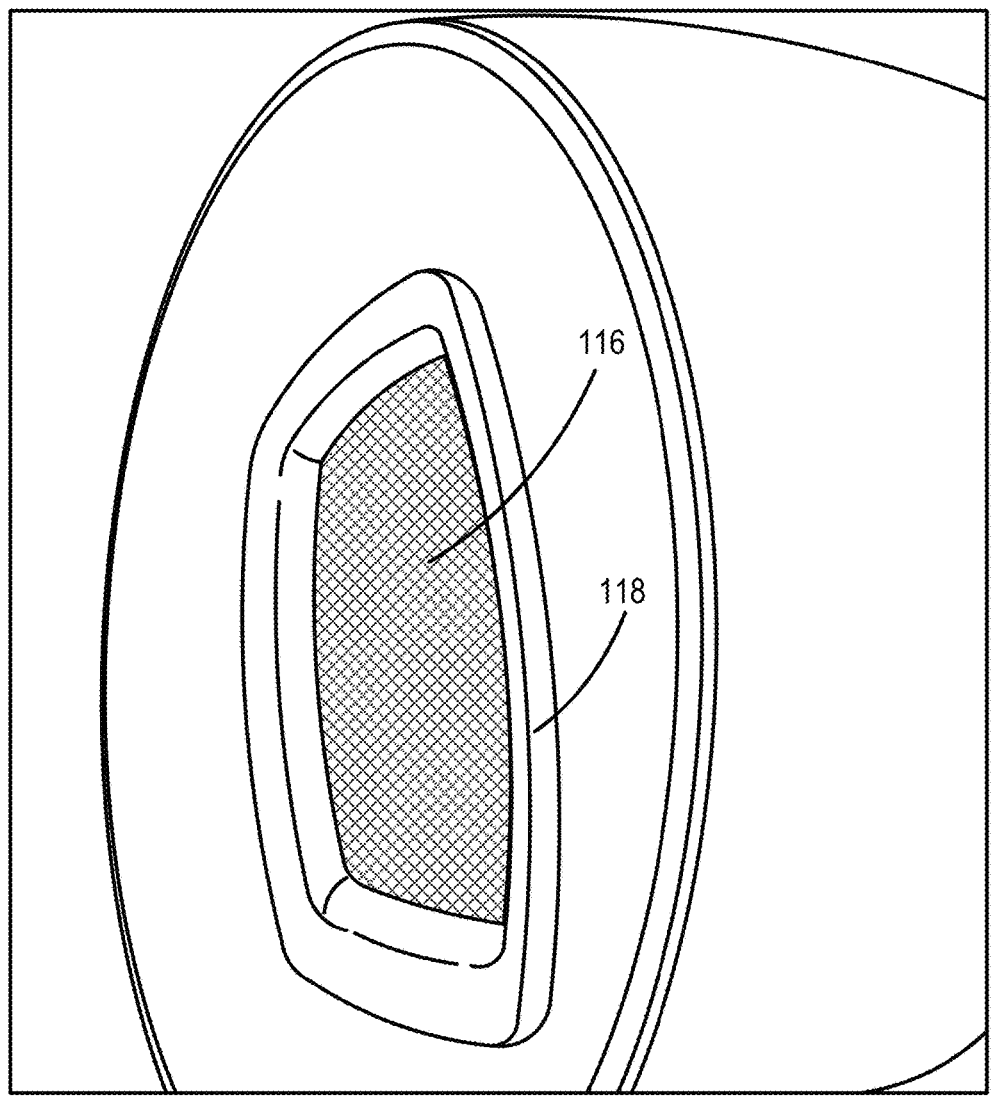

In some cases, in order to provide mechanical stability to the grill assembly 116, the grill can be coupled to a rigid (e.g., hard or non-compressible) portion of the seat. For example, the grill assembly 116 can be attached to a metal frame of the seat or headrest, or to a portion of the acoustic enclosure. In some cases, as shown in FIG. 1D, the grill assembly 116 may include a grill ring 118 which in turn is coupled to a rigid portion of the headrest. While attaching a grill assembly 116 or a grill ring 118 to a rigid portion of a seat provides mechanical stability for the overall grill assembly, in some cases it could be more desirable to decouple the grill assembly from rigid portions of the seat in order to improve user experience and comfort. For example, if the grill assembly is disposed on a headrest, a user may at times grab the headrest with hands or roll his/her head across the front and possibly the leading edge sides of the headrest. If a portion of the grill assembly is disposed near the leading side edges of the headrest, and forces from the hand or head are transferred to a rigid internal structure of the headrest via the portion of the grill assembly, that may cause discomfort to the user, and degrade the user experience. By using technology described herein, the grill assembly may be decoupled from rigid portions of the seat, such that forces applied by the user are softened, and the resulting user experience is comfortable. In some cases, at least a portion of the grill assembly (e.g., a grill ring 118) may be constructed from a soft material (e.g., materials with shore A hardness less than 90) to further enhance the comfort level of the user. Examples of such soft material includes liquid silicone rubber (LSR), rubber urethanes, or other materials having shore A hardness in the range 20-90.

In some implementations, the grill assembly may be decoupled from rigid substructures of the seat by attaching a portion of the grill assembly (e.g., the grill ring or the grill) directly on a non-rigid material such as soft foam which, in some cases, forms an outer layer of the seat. For example, a grill may be snapped into grooves defined on the soft foam. However, in some cases, this may result in the grill becoming loose over time, and a gap may form between the grill assembly 116 and the underlying non-rigid material. This in turn may reduce cosmetic appeal of the grill assembly, and the seat in general. Therefore, when a grill assembly is decoupled from a rigid structure of a seat, it may be desirable to securely attach the grill to the non-rigid outer layers in a way that the grill assembly does not become loose over time.

In some implementations, mechanical stability for grill assemblies that are decoupled from rigid structures in the seat may be increased by securely attaching at least a portion of the grill assembly to an outer layer of the seat. An example of such a configuration is shown in FIGS. 2A-2C, which illustrate a grill assembly disposed in a seat headrest 200. FIG. 2A shows an example of the grill assembly where the grill mount 205 is disposed only around a portion of the periphery of the grill assembly. FIG. 2B shows another example where the grill mount 205 extends over a larger portion of the periphery of the grill assembly, as compared to the example of FIG. 2A. In some implementations, the headrest 200 includes an interior chamber (described in additional detail with reference to FIG. 5) for accommodating an acoustic transducer such as a speaker, and one or more acoustic channels between the interior chamber and an external opening in the seat headrest 200. As shown in FIG. 2A, a grill assembly including a perforated grill 202 may be disposed over the external opening, for example, to improve aesthetics and allow acoustic energy from the acoustic transducer to radiate outwards. In some implementations, the headrest 200 includes a cover layer (not shown) disposed over an outer layer (e.g., soft foam) 210 of the headrest. The cover layer can also be referred to as a skin. Examples of the cover layer can include, for example, leather, fabric, and synthetic leather.

In some implementations, the grill assembly is decoupled from rigid substructures such as a seat frame or the interior chamber. In such cases, mechanical stability of the grill assembly may be improved by including in the grill assembly a substantially rigid grill mount 205 that is securely attached to an outer layer 210 of the headrest 200. As shown in the cross-sectional view of FIG. 2C, the grill mount 205 can be disposed around at least a portion of the periphery of the acoustic channel 226 to support the grill assembly. In some implementations, the grill assembly can include a grill ring 215, a portion of which engages with the grill mount 205, for example, via an engagement structure 220 as illustrated in FIG. 2C. In some implementations, the engagement structure 220 is configured to engage a portion of a speaker grill-assembly in a mating configuration (e.g., a snap engagement mechanism) such that the speaker grill-assembly is removable from the engagement structure following an engagement. This allows, for example, the speaker-grill assembly to be attached to the grill mount 205 in a removable configuration during an assembly of the seat or headrest. In some implementations, the portion of the grill assembly (e.g., the grill ring) engaging with the grill mount can be configured such that the portion visually occludes the grill mount upon engagement. In some implementations, the cover layer or skin of the headrest 200 may also visually occlude the grill mount. In some cases, such a configuration may be aesthetically preferred.

In some implementations, the grill mount 205 extends only around a portion of the periphery of the acoustic channel. For example, the grill mount 205 may extend only between the points 206 and 207 (as illustrated in FIG. 2A) to engage with a corresponding portion of the grill assembly (e.g., a corresponding portion of the grill ring 215), for example, via the engagement structure 220. In such cases, the remaining portion of the grill ring 215 can be directly attached to the outer layer 210 (e.g., without an intervening rigid layer such as the grill mount 205), for example, using a groove defined in the outer layer 210, thereby floating a portion of the surface that holds the grill ring 215 in place. By floating a portion of the surface that holds the grill ring in place, the grill ring (which, in some implementations, may be substantially rigid) can be configured to move due to applied forces, thereby increasing an area of contact with the outer layer 210 (e.g., soft foam) of the headrest, and allowing the outer layer 210 to absorb a portion of such applied forces. This, in turn, may spread out a locally applied force over a larger (and potentially softer) outer layer 210, thereby improving the comfort experienced by the user (e.g., an occupant of the seat). In some implementations, the soft outer layer 210 can include solid foams such as open-cell foams or closed-cell foams.

Figure 2E:
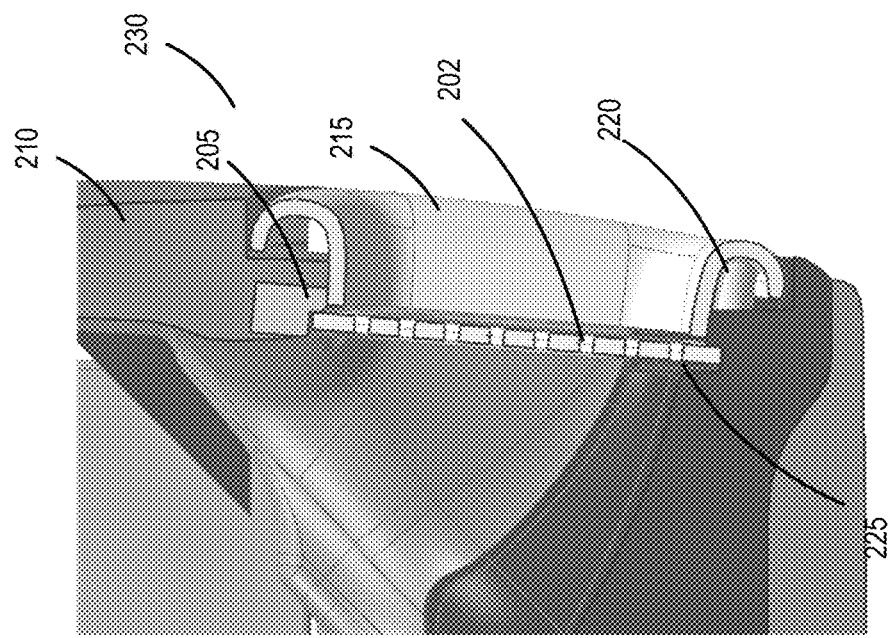
Figure 2D:
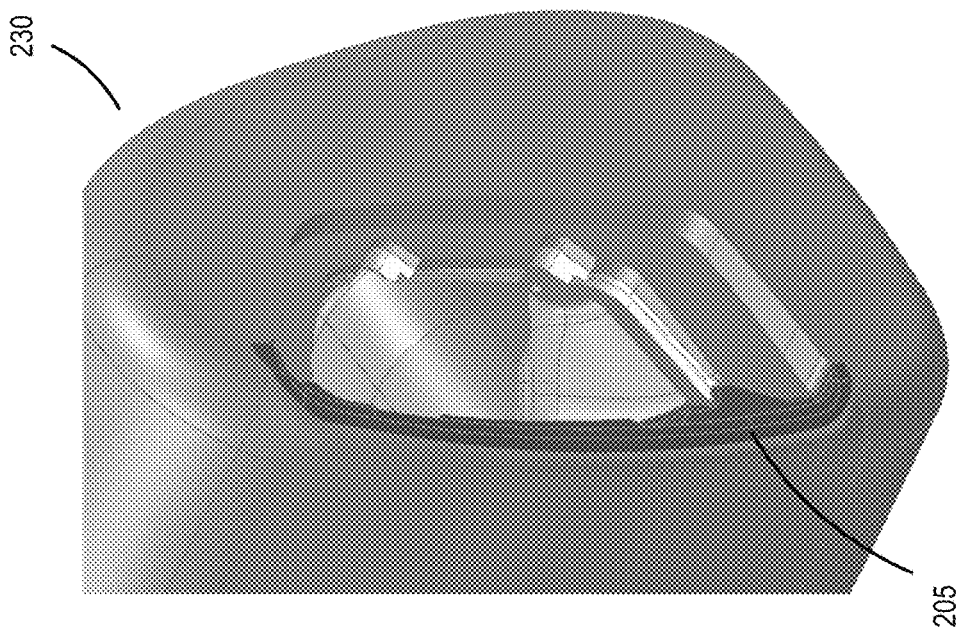

In some implementations, the grill mount 205 can be extended around a larger portion of the periphery of the acoustic channel than that between the points 206 and 207. An example of such an implementation is shown in FIG. 2B. For example, the grill mount 205 may be disposed around the periphery of the acoustic channel such that grill ring 215 attaches to the grill mount 205 around the periphery of the grill ring 215. In some implementations, more than one disjoint grill mounts (e.g., two separate grill mounts disposed on substantially opposite portions around the periphery of the acoustic channel) may be used to engage with different portions of the grill ring 215. The grill mount 205 may be disposed at various portions of the periphery. In FIGS. 2A-2C, the grill mount 205 is disposed towards the back of the headrest 200. FIGS. 2D and 2E show an example of another headrest 230 with a different type of grill ring 215.

In some implementations, the grill assembly includes a perforated grill 202 that engages with the grill ring 215. The perforated grill 202 can be configured to engage with the grill ring 215 in various ways. For example, FIG. 2C illustrates one example of a mating configuration 225 between the grill 202 and the grill ring 215. FIG. 2E illustrates another example of a mating configuration 225 between the grill 202 and the grill ring. The grill ring can also be attached to the grill mount 205 via various types of engagement structures 220. FIGS. 2C and 2E illustrate two different examples of the engagement structure 220, respectively.

In some implementations, the grill mount 205 is produced separately from the seat in which it is disposed, and attached to a portion of a periphery of an acoustic channel in the seat. For example, the grill mount 205 may be attached to the outer layer 210 of a vehicle seat using an adhesive applied on an attachment surface 227 that securely adheres to a corresponding surface on the outer layer 210. In some implementations, the grill mount 205 can be configured to fit a profile of the portion of the periphery of the acoustic channel around which the grill mount 205 is disposed.

In some implementations, the grill mount 205 may be manufactured as an integral portion of the seat or headrest. For example, the grill mount 205 may be over-molded into the outer layer 210 during production of a seat portion such as the headrest. This is illustrated in the example variant shown in FIGS. 2F and 2G. In this example, the grill mount 205 is an integral part of the outer layer 210, and may be produced together by an over-molding process. In some implementations, such over-molding may cause the outer layer 210 (e.g., soft foam) to form a surface bond with the grill mount 205. From a production standpoint, over-molding the grill mount into the outer layer 210 may also be cost effective in some cases. In some implementations, during the over-molding process, the engagement structure 220 between the grill ring 215 and the outer layer 210 can be enlarged, with the over-molded grill mount 205 acting as a structural anchoring element for the grill ring 215.

In some implementations, at least portions of the grill assembly may be constructed using soft materials. For example, the grill ring 215 and/or the perforated grill 202 may be constructed from materials with shore A hardness less than a threshold (e.g., 90). When a soft material (e.g., LSR or soft urethanes) is used for constructing at least a portion of the grill assembly disposed in a headrest, the grill assembly may dampen applied forces, for example, due to spring-like force transmission to rigid internal structure of the headrest. This may, in some cases, make the grill assembly more deformable, and/or improve comfort level and user experience. While soft materials used in the grill assembly may improve comfort levels, a hardness above a threshold may be needed to ensure that the grill assembly stays in place during typical use. Therefore, materials within an appropriate range of hardness may be used in constructing at least a portion of the grill assembly. For example, materials having shore A hardness in the range 20-90 (including, for example, liquid silicone rubbers (LSR), and rubber urethanes) may be selected for the grill ring 215, the perforated grill 202, and/or other portions of the grill assembly. Shore hardness of some example materials are represented the chart shown in FIG. 3. In some implementations, the material may also be selected based on a target wall thickness that is to be implemented in portions of the grill assembly. For example, the material can be selected based on a determination that a wall thickness less than a threshold (e.g. 3 mm) may be achieved. In some implementations, using such soft and/or flexible materials in the grill assembly may reduce one or more additional parts (e.g., screws, adhesives) and/or one or more additional processing steps in the assembly process.

Figure 2G:
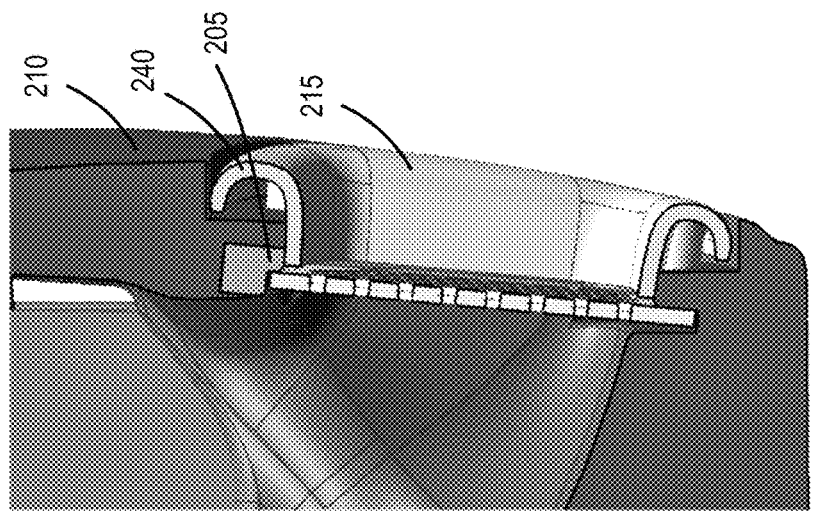
Figure 2F:
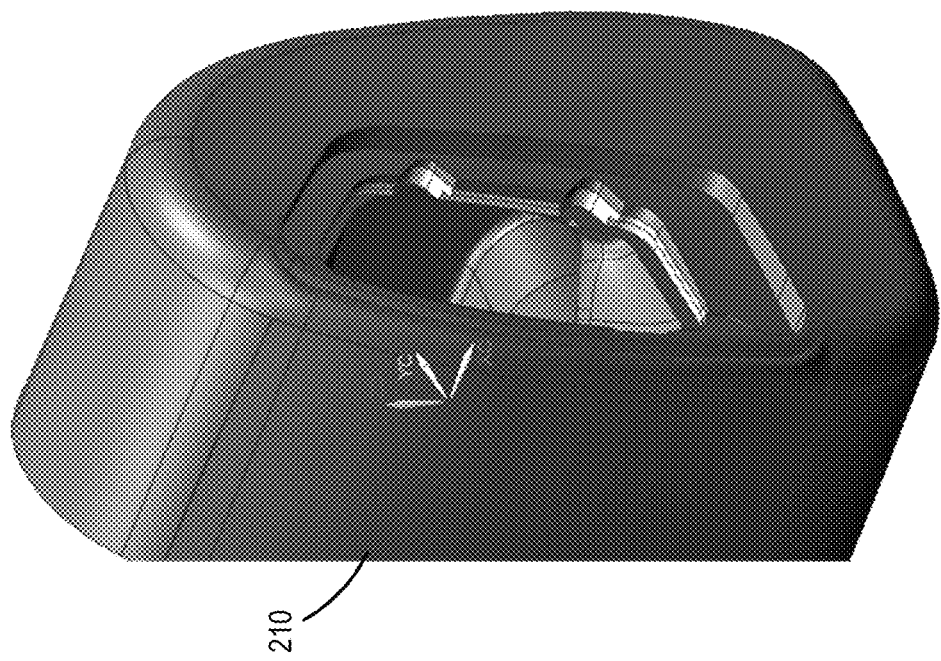
Figure 4C:
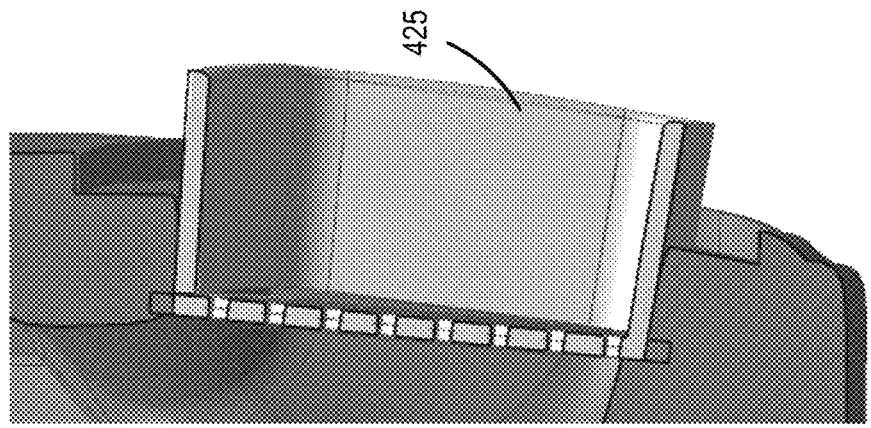
FIGS. 4A-4C show examples of grill assemblies constructed from soft materials.
Figure 4B:
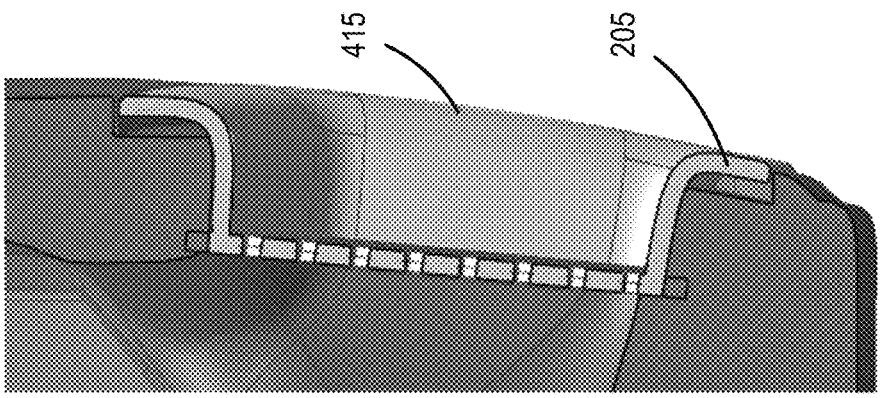
Figure 4A:
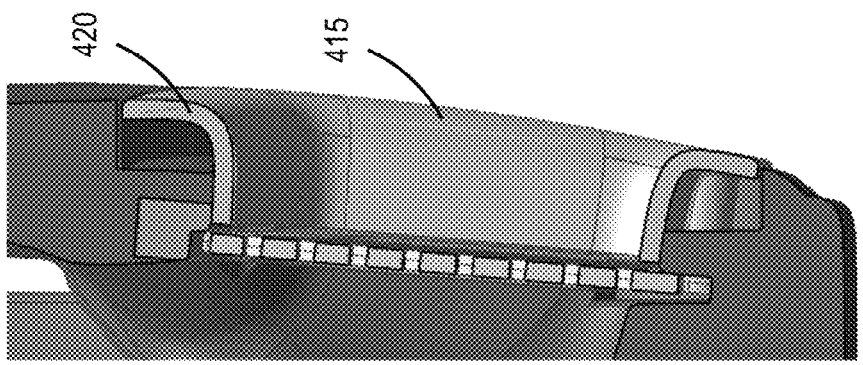

FIGS. 4A-4C depict various examples of grill assemblies constructed with soft materials. Referring to FIG. 4A, a grill ring 415 constructed from a soft material (e.g., a material with shore hardness less than 50) can be configured to have a substantially L-shaped cross section 420. This is different from the cross sections of the corresponding portion in grill rings (e.g., the grill ring 215 depicted in FIGS. 2D and 2F) constructed from a harder material (e.g. a material with shore hardness more than 50). As shown in FIG. 2G, the cross section 240 of a grill ring constructed from a hard material may have a substantially U-shaped cross-section. In some cases, this may be due to safety regulations imposed on hard structures used in vehicles. For example, a safety regulation may dictate that structures constructed from materials with shore A hardness greater than 50 may not have an exposed sharp edge that could potentially injure an occupant in the event of an accident. In such cases, the cross-section 240 of a grill ring 215 may need to be made U-shaped, for example, to produce a rounded surface in accordance with any applicable regulations. In some cases, the regulations may also specify a radius associated with the substantially U-shaped structure, for example, to dictate a level of allowable roundedness. In some cases, design constraints imposed by regulations associated with hard materials may be reduced by using soft materials that are not subject to such regulations. This in turn, may allow for flexibility in design and styling goals.

In some implementations, using a soft material (e.g., a material having shore A hardness in the range 20-50) can allow for making a grill ring 415 flexible, such that the grill ring 415 may be installed before a cover layer or skin (leather, fabric, etc.) of the seat is installed. This is illustrated in the examples shown in FIGS. 4B and 4C. In this example, the grill ring 415 is flexible, and molded onto a grill mount 205. In some implementations (e.g., when the grill ring is installed prior to installation of a cover layer), an overhang portion 425 (also referred to as a lip) of the grill ring 415 can be configured to be flexed open (as shown in FIG. 4C) such that a portion of the cover layer or skin May be tucked under the grill ring 415. Upon being released from the flexed condition, the grill ring 415 reverts back to the configuration depicted in FIG. 4B, and may securely retain the portion of the cover layer tucked under the grill ring 415. In some implementations, the grill ring 415 may be configured to be fully removable, such that the entire grill ring 415 can be taken out and then replaced over the portion of the cover layer as part of the assembly process.

Figure 5:
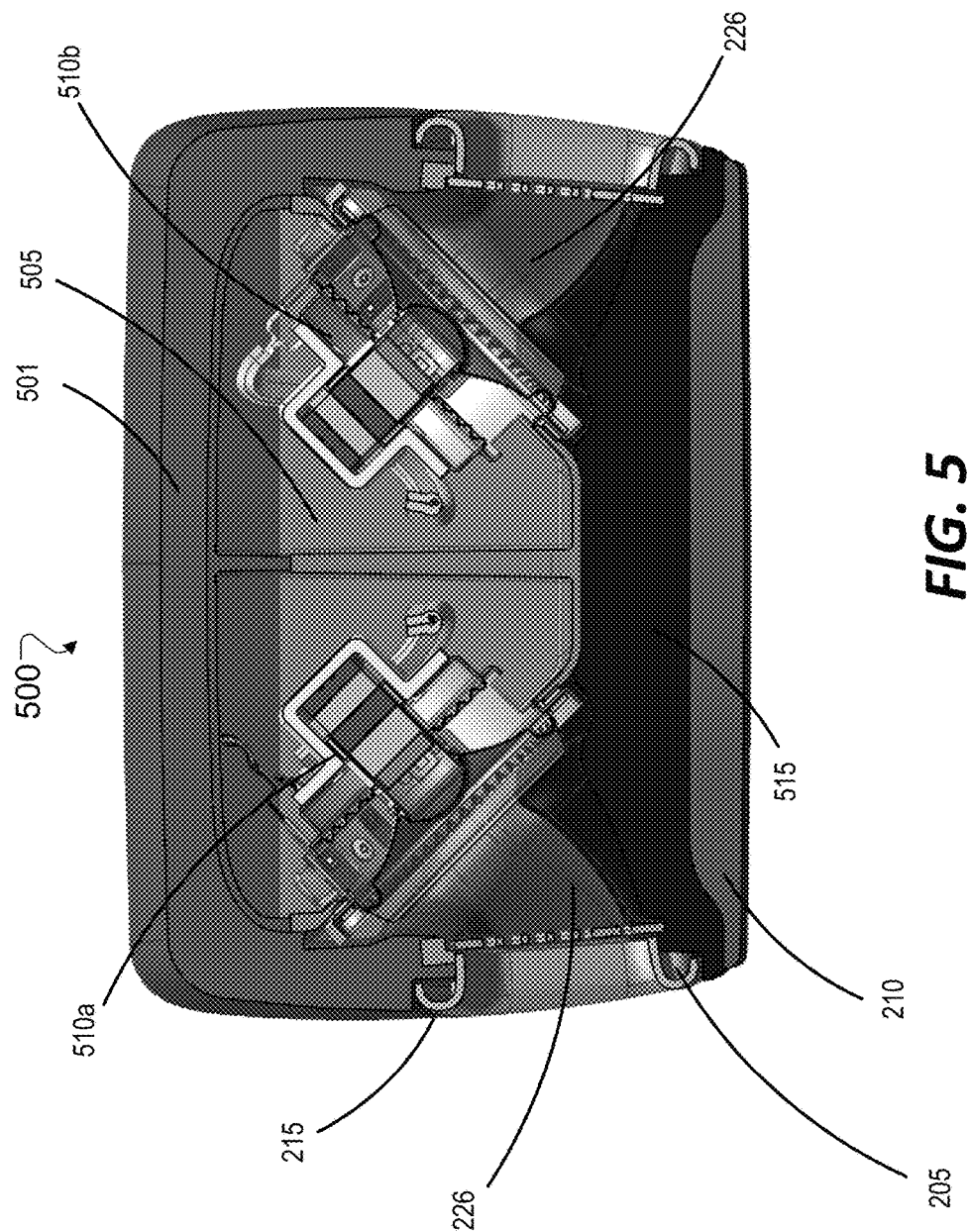
FIG. 5 shows a cross-section of an example headrest in accordance with the technology described herein.

FIG. 5 shows a cross-section of an example of a vehicle headrest 500 that includes the grill assembly described above. A housing 501 of the headrest 500 includes an interior chamber 505 (also referred to as an acoustic enclosure) that supports the acoustic transducers or speakers 510a and 510b (510 in general). The acoustic enclosure 505 can include separate chambers for each of the speakers 510 disposed within the acoustic enclosure 505. In some implementations, the housing 501 of the headrest further includes a rigid portion or rigid support 515 disposed between the front wall of the housing 501 and the interior chamber 505. The rigid support 515 can be composed of lightweight rigid material such as expanded resin, expanded polystyrene foam, or extruded polystyrene foam. The rigid support 515 can be configured to serve various purposes such as providing mechanical and structural stability to the headrest housing, providing a cushioning member between the front wall of the housing 501 and the interior chamber 505, and providing acoustic isolation between the speakers within the housing 501.

In some implementations, the headrest 500 includes an acoustic channel 226 disposed between a speaker 510 and the corresponding opening in the external surface of the headrest 500. The acoustic channels 226 can be configured for controlling a radiation pattern of the acoustic energy radiated from the speakers 510. In some implementations, the acoustic channels are configured to create a radiation pattern that increases the efficiency from left speaker to left ear and right speaker to right ear as compared to the left speaker to right ear and right speaker to left ear, respectively. In some implementations, a speaker grill assembly, including, for example, the perforated speaker grill 202 and a grill ring 215, is disposed over the external opening of the housing 501.

In some implementations, a grill mount 205 is configured to be attached to an outer layer 210, such that the grill mount 205 is decoupled from a rigid substructure (e.g., the rigid structure 515, or a frame of the headrest 500). This is shown in the blown-up inset in FIG. 5. While the example of FIG. 5 shows the grill mount 205 to be disposed on both sides of the cross section of the grill assembly, the grill mount 205 may be disposed only along a portion of the periphery of the acoustic channel 226. As described above, at least a portion of a grill ring 215 can be configured to engage with the grill mount 205. In some implementations, a portion of the speaker grill ring 215 can be configured to overlap with a cover layer (e.g., fabric, leather, etc.) of the headrest 500 such that the grill ring holds the cover layer in a tightly secured configuration against the housing 501. Such a tight configuration can improve the cosmetic appearance of the headrest, for example, by reducing a sagging of the cover layer.

A number of implementations have been described. However, other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A seat headrest comprising:
   an interior chamber that accommodates an acoustic transducer, and
   an acoustic channel disposed between the interior chamber and an external opening in the seat headrest;
   an outer layer disposed around at least a portion of a periphery of the external opening;
   an external skin that covers a portion of the exterior of the seat headrest;
   a grill assembly disposed over the external opening, the grill assembly comprising a flexible grill ring disposed around a portion of the periphery of the grill assembly, the flexible grill ring configured to retain a portion of the external skin against the outer layer in a substantially secure configuration.

2. The headrest of claim 1, wherein the flexible grill ring is constructed from a material with shore A hardness less than 50.

3. The headrest of claim 1, further comprising a grill mount disposed in or attached to the outer layer, the grill mount extending, at least in part, around the periphery of the acoustic channel, and configured to engage with a portion of the grill-assembly in a mating configuration.

4. The headrest of claim 1, wherein the outer layer comprises a material having shore A hardness less than 50.

5. The headrest of claim 1, wherein the outer layer comprises closed-cell foam.

6. The headrest of claim 1, wherein the external skin comprises leather or fabric.

7. The headrest of claim 1, wherein, in a first configuration of the flexible grill ring, a separation between the outer layer and a portion of the flexible grill ring is configured to receive the portion of the external skin.

8. The headrest of claim 7, wherein, in a second configuration of the flexible grill ring, the flexible grill ring retains the portion of the external skin against the outer layer in the substantially secure configuration.

9. The headrest of claim 1, wherein the flexible grill ring is removably disposed over the external opening.

10. A grill assembly for a speaker system disposed in a portion of a vehicle seat, the grill assembly comprising:
    an engagement structure configured to allow the grill assembly to engage with a grill mount attached to an outer layer of the vehicle seat, the outer layer disposed around at least a portion of a periphery of an external opening of an acoustic channel associated with the speaker system; and a flexible grill ring disposed around a portion of the periphery of the grill assembly, the flexible grill ring configured to retain a portion of an external skin of the vehicle seat against the outer layer in a substantially secure configuration.

11. The grill assembly of claim 10, wherein the engagement structure comprises a snap-fit mechanism configured to engage with the portion of the speaker grill assembly.

12. The grill assembly of claim 10, wherein the flexible grill ring is constructed from a material with shore A hardness less than 50.

13. The grill assembly of claim 10, wherein the wherein the outer layer comprises a material having shore A hardness less than 50.

14. The grill assembly of claim 10, wherein the outer layer comprises closed-cell foam.

15. The grill assembly of claim 10, wherein the portion of the vehicle seat comprises a headrest.

16. The grill assembly of claim 10, wherein the external skin comprises leather or fabric.

17. A housing for an acoustic transducer, the housing being disposed in a vehicle seat, and comprising:
an interior chamber, and
an acoustic channel disposed between the interior chamber and an external opening of the housing, wherein at least a portion of a periphery of the external opening comprises an outer layer; and
a grill assembly disposed over the external opening, the grill assembly comprising a flexible grill ring disposed around a portion of the periphery of the grill assembly, the flexible grill ring configured to retain a portion of an external skin of the vehicle seat against the outer layer in a substantially secure configuration.

18. The housing of claim 17, wherein the flexible grill ring is constructed from a material with shore A hardness less than 50.

19. The housing of claim 17, further comprising a grill mount disposed in or attached to the outer layer, the grill mount extending, at least in part, around the periphery of the acoustic channel, and configured to engage with a portion of the grill-assembly in a mating configuration.

20. The housing of claim 17, wherein,
in a first configuration of the flexible grill ring, a separation between the outer layer and a portion of the flexible grill ring is configured to receive the portion of the external skin, and
in a second configuration of the flexible grill ring, the flexible grill ring retains the portion of the external skin against the outer layer in the substantially secure configuration.

* * * * *

UNITED STATES PATENT AND TRADEMARK OFFICE
CERTIFICATE OF CORRECTION

PATENT NO.        : 10,029,590 B2
APPLICATION NO.   : 15/616414
DATED             : July 24, 2018
INVENTOR(S)       : Bradford Kyle Subat and Charles Oswald Page 1 of 1

It is certified that error appears in the above-identified patent and that said Letters Patent is hereby corrected as shown below:

In the Claims

Column 9, Line 15, Claim 13, delete "wherein the wherein the" and insert -- wherein the --, therefor.

Signed and Sealed this
Fifth Day of March, 2019

Andrei Iancu
*Director of the United States Patent and Trademark Office*